US012675349B2

(12) United States Patent
Rao et al.

(10) Patent No.: US 12,675,349 B2
(45) Date of Patent: Jul. 7, 2026

(54) METHOD AND SYSTEM FOR REAL-TIME COMMUNICATION BETWEEN MULTIPLE BROWSER WINDOWS

(71) Applicant: RAKUTEN MOBILE, INC., Tokyo (JP)

(72) Inventors: Ankit Rao, Indore (IN); Yatendra Singh, Indore (IN); Keshav Sharma, Indore (IN); Rajesh Pal, Indore (IN)

(73) Assignee: RAKUTEN MOBILE, INC., Tokyo (JP)

( * ) Notice: Subject to any disclaimer, the term of this patent is extended or adjusted under 35 U.S.C. 154(b) by 696 days.

(21) Appl. No.: 17/924,147

(22) PCT Filed: Sep. 14, 2022

(86) PCT No.: PCT/US2022/043410
§ 371 (c)(1),
(2) Date: Nov. 9, 2022

(87) PCT Pub. No.: WO2024/010599
PCT Pub. Date: Jan. 11, 2024

(65) Prior Publication Data
US 2024/0220343 A1      Jul. 4, 2024

(30) Foreign Application Priority Data
Jul. 5, 2022     (IN) ............................. 202241038551

(51) Int. Cl.
*G06F 9/54* (2006.01)
*G06F 3/0483* (2013.01)

(52) U.S. Cl.
CPC ............ *G06F 9/547* (2013.01); *G06F 3/0483* (2013.01); *G06F 2203/04803* (2013.01)

(58) Field of Classification Search
None
See application file for complete search history.

(56) References Cited

U.S. PATENT DOCUMENTS 11,036,344 B1 * 6/2021 Portelli ............... G06F 3/04897
2006/0031404 A1   2/2006 Kassab
(Continued)

OTHER PUBLICATIONS

International Search Report dated Jan. 11, 2023 from the International Searching Authority in International Application No. PCT/US2022/043410.
(Continued)

*Primary Examiner* — Umut Onat
(74) *Attorney, Agent, or Firm* — Sughrue Mion, PLLC

(57) ABSTRACT

A method for real-time communication between multiple browser windows by a system (100). The method includes opening, by the processor (180), a parent browser window and determining, by the processor (180), child browser window needs to be opened by the parent browser window. The method also includes receiving, by the processor (180), an input for creating a communication channel between the parent browser window and the child browser window and opening, by the processor (180), the child browser window from the parent browser window. Further, the method includes creating, by the processor (180), the communication channel between the parent browser window and the child browser window based on the received input; and receiving, by the processor (180), data by the child browser window from the parent browser window through the created communication channel.

13 Claims, 5 Drawing Sheets

(56)     References Cited

U.S. PATENT DOCUMENTS

| | | | |
|---|---|---|---|
| 2006/0129949 A1* | 6/2006 | Wu | G06F 3/0481 |
| | | | 715/804 |
| 2009/0063997 A1* | 3/2009 | Naick | G06F 3/0482 |
| | | | 715/760 |
| 2014/0109041 A1 | 4/2014 | Yunten | |
| 2016/0188138 A1* | 6/2016 | Chen | G06F 16/957 |
| | | | 715/777 |
| 2018/0121217 A1 | 5/2018 | Jarabek et al. | |
| 2018/0260270 A1 | 9/2018 | Kucera et al. | |
| 2020/0192533 A1* | 6/2020 | Dobrowolski | G06F 3/0482 |
| 2021/0049222 A1* | 2/2021 | Pascente | G06F 16/9535 |
| 2022/0317822 A1* | 10/2022 | Fong | G06F 9/451 |
| 2023/0036980 A1* | 2/2023 | Chen | G06F 9/547 |

OTHER PUBLICATIONS

Written Opinion dated Jan. 11, 2023 from the International Searching Authority in International Application No. PCT/US2022/043410.

* cited by examiner

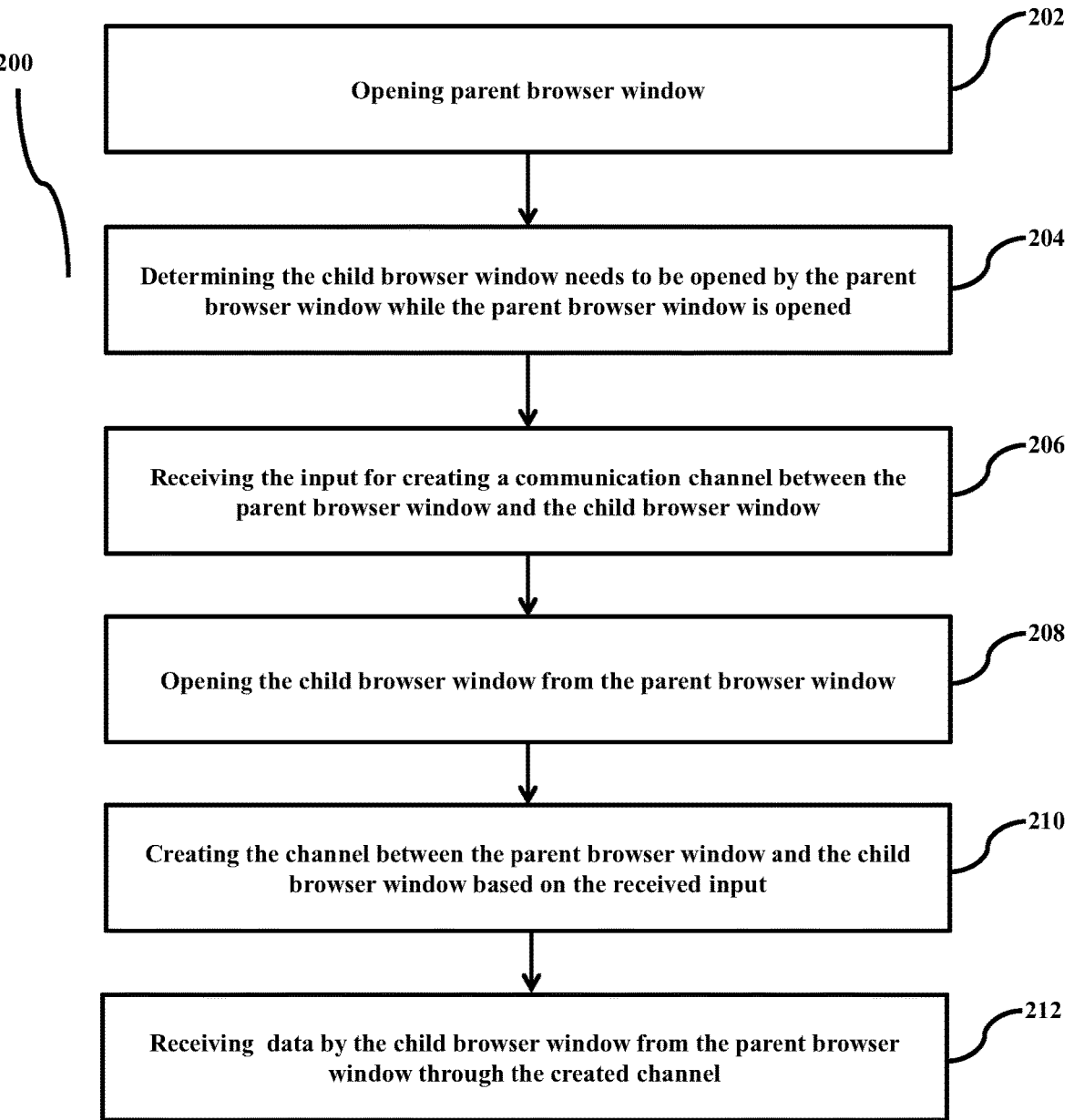

200

Opening parent browser window 202

Determining the child browser window needs to be opened by the parent browser window while the parent browser window is opened 204

Receiving the input for creating a communication channel between the parent browser window and the child browser window 206

Opening the child browser window from the parent browser window 208

Creating the channel between the parent browser window and the child browser window based on the received input 210

Receiving data by the child browser window from the parent browser window through the created channel 212

FIG. 2

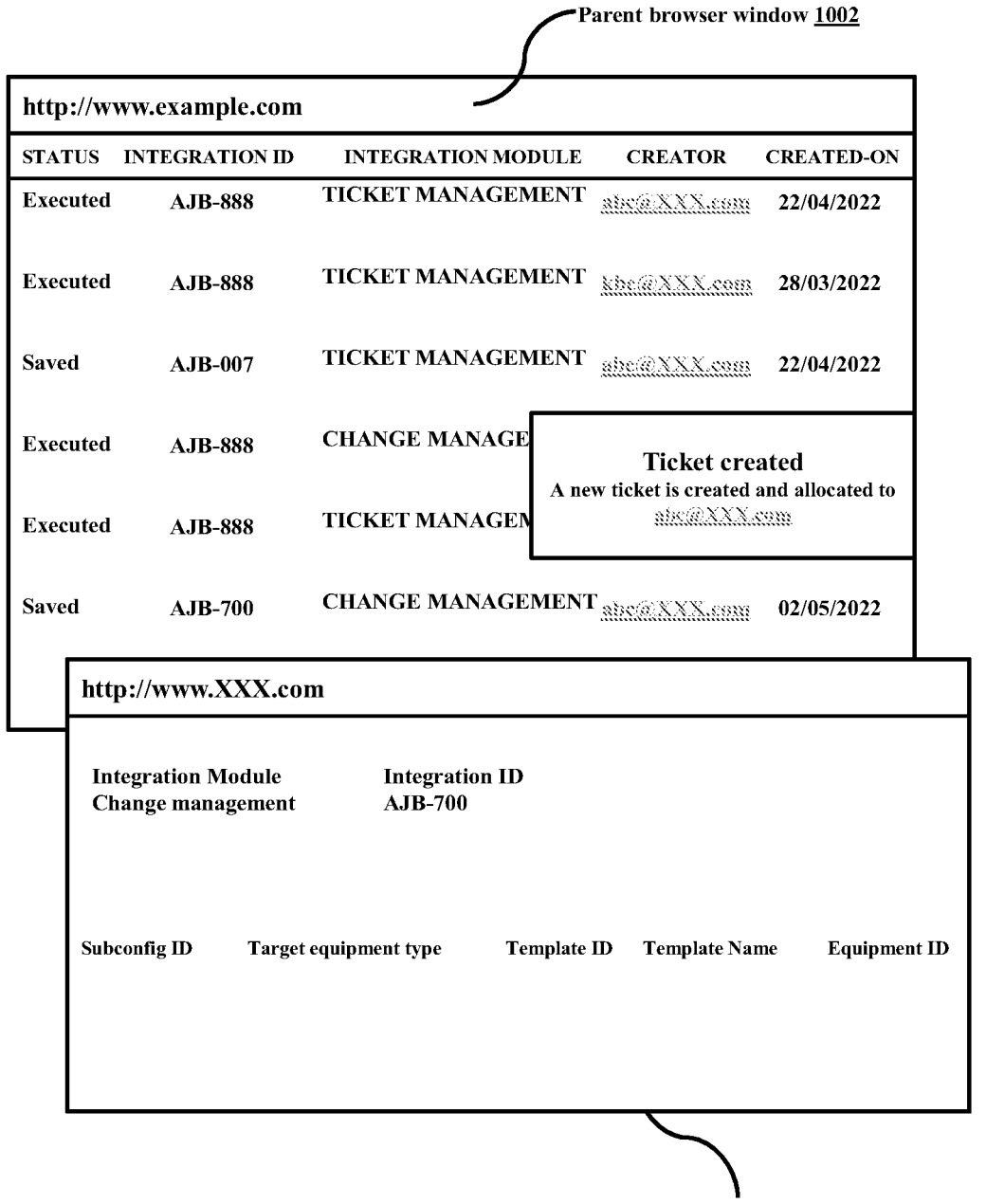

Parent browser window 1002 http://www.example.com

| STATUS | INTEGRATION ID | INTEGRATION MODULE | CREATOR | CREATED-ON |
|---|---|---|---|---|
| Executed | AJB-888 | TICKET MANAGEMENT | abc@XXX.com | 22/04/2022 |
| Executed | AJB-888 | TICKET MANAGEMENT | kbc@XXX.com | 28/03/2022 |
| Saved | AJB-007 | TICKET MANAGEMENT | abc@XXX.com | 22/04/2022 |
| Executed | AJB-888 | CHANGE MANAGE | | |
| Executed | AJB-888 | TICKET MANAGEN | | |
| Saved | AJB-700 | CHANGE MANAGEMENT | abc@XXX.com | 02/05/2022 |

Ticket created
A new ticket is created and allocated to
abc@XXX.com http://www.XXX.com

| Integration Module | Integration ID |
|---|---|
| Change management | AJB-700 |

| Subconfig ID | Target equipment type | Template ID | Template Name | Equipment ID |
|---|---|---|---|---|

Child browser window 1004

FIG. 5

METHOD AND SYSTEM FOR REAL-TIME COMMUNICATION BETWEEN MULTIPLE BROWSER WINDOWS

CROSS REFERENCE TO RELATED APPLICATIONS

This application is a National Stage of International Application No. PCT/US2022/043410 filed Sep. 14, 2022, claiming priority based on Indian Patent Application number 202241038551 filed Jul. 5, 2022.

FIELD OF INVENTION

The present invention relates to application browsers and more specifically related to a method and a system for real-time communication between multiple browser windows.

BACKGROUND

In general, multiple browser windows are used as an interface to manage a user's various activities on a system, such as e-mail, social networking, blogging, posting photos, watching videos, editing documents, and so on. As a result, the system should be able to manage multiple activities as well as switch between multiple browser windows. One of the most important aspects of using multiple browser windows is communication between them. Since there are multiple browser windows being used for various activities at a same time, a speed at which a browser window retrieves and presents information from a server may be reduced. Therefore, the reduced speed degrades user experience.

Conventionally, localStorage property is used for data communication between the multiple browser windows, which allows the system to save key-value pairs of the browser windows with no expiration date. The localStorage is used as a shared and synchronized storage of the multiple browser windows to store information about events such as notifications, execution of some functions, etc. from each of the multiple browser windows along with a timestamp indicating when the information about the events was retrieved from a concerned server. However, the use of the localStorage includes various drawbacks. The localStorage has data storage limits which eventually limit a number of browser windows that can communicate at any time. Also, the localStorage may overflow if the information about events is plenty. Also, the localStorage works on browser windows having a same origin (example browser windows with same scheme or same hostname or a same and port), and hence cross tab communication between the multiple browser windows of different origins is not possible. Thus, it is desired to address the aforementioned disadvantages or other shortcomings or at least provide a useful alternative.

OBJECT OF INVENTION

The principal object of the embodiments herein is to provide a method and a system for communication between multiple browser windows in real-time by creating a communication channel between a parent browser window and a child browser window. Therefore, the proposed method provides for live communication and data transfer between the parent browser window and the child browser window, and hence there is no limit for amount of data that gets exchanged between the parent browser window and the child browser window. Therefore, the system is not limited by storage capacity and also will be able to access and process a large number of browser windows in real-time, with an increased processing capacity.

SUMMARY

Accordingly, the embodiment herein is to provide a method for communication between multiple browser windows in real-time by a system. The method includes opening, by a processor, a parent browser window and determining, by the processor, that a child browser window needs to be opened by the parent browser window while the parent browser window is opened. The method also includes receiving, by the processor, an input for creating a communication channel between the parent browser window and the child browser window and opening, by the processor, the child browser window from the parent browser window. Further, the method includes creating, by the processor, the channel between the parent browser window and the child browser window based on the received input: and receiving, by the processor, data by the child browser window from the parent browser window through the created channel.

In an embodiment, the input for creating the channel includes a uniform resource locator (URL) for the child browser window, a channel name indicating the channel between the parent browser window and the child browser window, a parameter for indicating whether the child browser window is one of a new browser window and a new tab in the parent browser window and a plurality of parameters indicating dimensions of the child browser window.

In an embodiment, opening, by the processor, the child browser window from the parent browser window includes determining, by the processor, that the child browser window comprising a same child browser window name does not exist already with the parent browser window; and opening, by the processor, the child browser window from the parent browser window.

In an embodiment, receiving, by the processor, the data by the child browser window from the parent browser window through the created channel includes sending by the child browser window an initialization event to the parent browser window for performing a handshake and accepting by the parent browser window the initialization event sent by the child browser window and performing the handshake. The method also includes authenticating the handshake received from the parent browser window by the child browser window based on a channel name of the channel created between the parent browser window and the child browser window and sending the data by the parent browser window to the child browser window through the created channel and receiving the data by the child browser window through the created channel from the parent browser window.

In an embodiment, the method further includes determining, by the processor, that the child browser window needs to be closed and automatically sending, by the processor, a response comprising output data from the child browser window to the parent browser window to reallocate a dump memory associated with the child browser window.

In an embodiment, the method further includes determining, by the processor, that the parent browser window is closed when the child browser window is still open: sending, by the processor, a notification to the child browser window that the parent browser window is closed; and automatically closing, by the processor, the child browser window.

Accordingly, the embodiments herein provide a system for communication between multiple browser windows in real-time. The system includes a memory, a processor, a communicator, and a display. The processor is configured to open a parent browser window and determine the child browser window needs to be opened by the parent browser window while the parent browser window is opened. The processor is also configured to receive an input for creating a communication channel between the parent browser window and the child browser window and open the child browser window from the parent browser window. Further, the processor is configured to create the channel between the parent browser window and the child browser window based on the received input: and receive data by the child browser window from the parent browser window through the created channel.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the scope thereof, and the embodiments herein include all such modifications.

BRIEF DESCRIPTION OF FIGURES

This invention is illustrated in the accompanying drawings, throughout which like reference letters indicate corresponding parts in the various figures. The embodiments herein will be better understood from the following description with reference to the drawings, in which:

FIG. 2 is a flow diagram illustrating a method for communication between the multiple browser windows in real-time by the system, according to an embodiment as disclosed herein.

FIG. 5 is an example illustrating the communication between the parent browser window and the child browser window of different origin, according to an embodiment as disclosed herein.

DETAILED DESCRIPTION OF INVENTION

Figure 1:
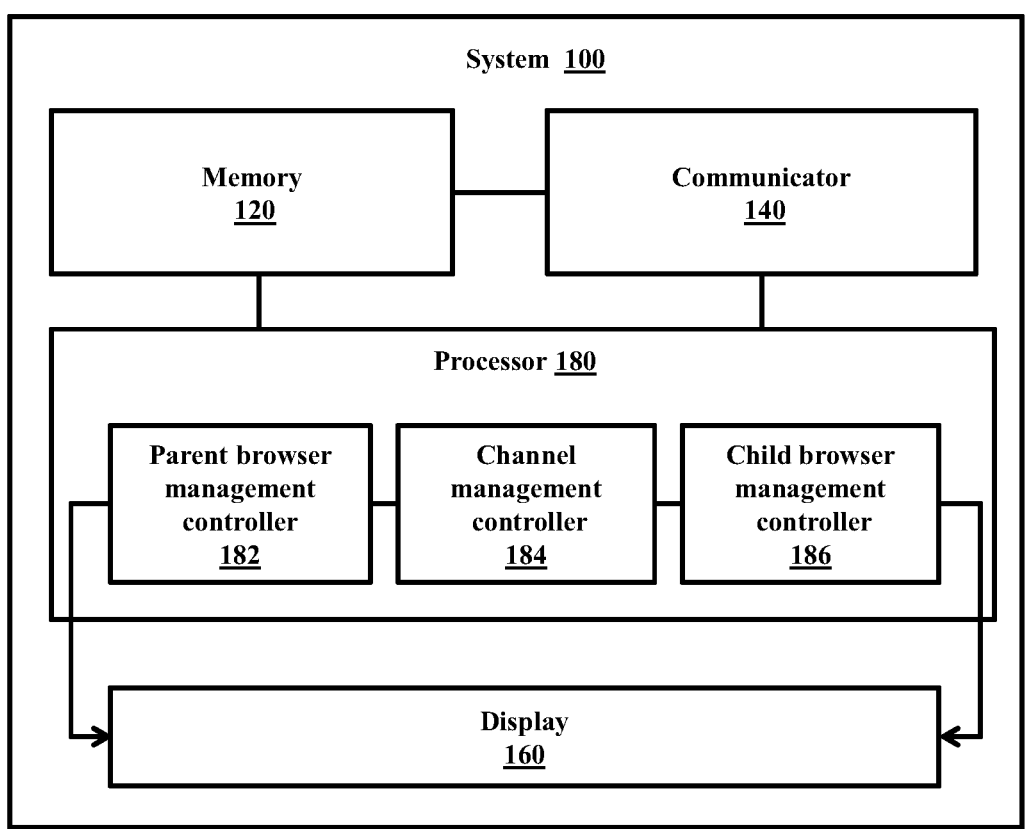
FIG. 1 is a block diagram of an system for communication between multiple browser windows in real-time, according to an embodiment as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits, and the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the present disclosure should be construed to extend to any alterations, equivalents, and substitutes in addition to those which are particularly set out in the accompanying drawings.

Accordingly, the embodiment herein is to provide a method for communication between multiple browser windows in real-time by a system. The method includes opening, by the processor, a parent browser window and determining, by the processor, a child browser window needs to be opened by the parent browser window while the parent browser window is opened. The method also includes receiving, by the processor, an input for creating a communication channel between the parent browser window and the child browser window and opening, by the processor, the child browser window from the parent browser window. Further, the method includes creating, by the processor, the channel between the parent browser window and the child browser window based on the received input: and receiving, by the processor, data by the child browser window from the parent browser window through the created channel.

Accordingly, the embodiments herein provide a system for communication between multiple browser windows in real-time. The system includes a memory, a processor, a communicator, and a display. The processor is configured to open a parent browser window and determine the child browser window needs to be opened by the parent browser window while the parent browser window is opened. The processor is also configured to receive an input for creating a communication channel between the parent browser window and the child browser window and open the child browser window from the parent browser window. Further, the processor is configured to create the channel between the parent browser window and the child browser window based on the received input: and receive data by the child browser window from the parent browser window through the created channel.

Conventional methods and systems for data communication between browser tabs uses localStorage. However, the localStorage includes multiple limitations i.e., the localStorage comprises storage limits which limits capacity of the system. Also, the localStorage only works on browser windows of same origin due to which cross browser window communication between browser windows of different origins is not possible.

Unlike the conventional methods and systems, the proposed method includes creating a communication channel using application program interface (APIs) between multiple browser windows and enabling live communication and data transfer between the browser windows. As a result, the proposed method makes the communication between the browser windows easy and enhances capabilities of the system. The proposed method also allows communication between the browser windows of cross origin.

Unlike the conventional methods and systems, the proposed method includes using live events such as for example an email notification, to automatically close or open the browser windows.

Unlike the conventional methods and systems, the proposed method includes the existence of the child browser windows is determined based on the existence of the parent browser window. If the parent browser window is closed, then the child browser window is notified and destroyed within a specific amount of time for example 2 seconds.

Unlike the conventional methods and systems, the proposed method includes using PostMessage (JAVASCRIPT™ API to enable cross origin communication safely between the multiple browser windows such as pages, pop-ups, and iframes) and to send data between the multiple browser windows whenever needed.

Referring now to the drawings and more particularly to FIGS. 1 through 5, where similar reference characters denote corresponding features consistently throughout the figures, there are shown preferred embodiments.

FIG. 1 illustrates a block diagram of an system (100) for communication between multiple browser windows in real-time, according to an embodiment as disclosed herein.

Referring to the FIG. 1, the system (100) can be for example but is not limited to an electronic device, a laptop, a palmtop, a desktop, a mobile phone, a smart phone, Personal Digital Assistant (PDA), a tablet, a wearable device, an Internet of Things (IoT) device, a virtual reality device, a foldable device, a flexible device, a display device, an immersive system, and a server device. In an embodiment, the system (100) includes a memory (120), a communicator (140), a display (160) and a processor (180).

The memory (120) stores various application program interface (API) s for the communication between multiple browser windows in real-time. Further, the memory (120) also stores instructions to be executed by the processor (140). The memory (120) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (120) may, in some examples, be considered a non-transitory storage medium. The term "non-transitory" may indicate that the storage medium is not embodied in a carrier wave or a propagated signal. However, the term "non-transitory" should not be interpreted that the memory (120) is non-movable. In some examples, the memory (120) can be configured to store larger amounts of information. In certain examples, a non-transitory storage medium may store data that can, over time, change (e.g., in Random Access Memory (RAM) or cache).

The communicator (140) includes an electronic circuit specific to a standard that enables wired or wireless communication. The communicator (140) is configured to communicate internally between internal hardware components of the system (100) and with external devices via one or more networks.

In an embodiment, the display (160) is a user interface (UI) configured to display an opened parent browser window (1002) and an opened child browser window (1004) each of which comprises actionable elements related to events occurring on each of the opened parent browser window (1002) and the opened child browser window (1004). The display (160) can receive inputs and is made of one of liquid crystal display (LCD), light emitting diode (LED), organic light-emitting diode (OLED), etc. The user inputs may be provided for example but are not limited to touch, swipe, drag, gesture, voice command, etc. The parent browser window (1002) and the child browser window (1004) are for example but are not limited to: a pair of browser windows, a pair of tabs, or a browser window and a tab.

The processor (140) communicates with the memory (120), the communicator (140), the display (160) and the processor (180). The processor (180) is configured to execute instructions stored in the memory (120) and to perform various processes. The processor may include one or a plurality of processors, may be a general-purpose processor, such as a central processing unit (CPU), an application processor (AP), or the like, a graphics-only processing unit such as a graphics processing unit (GPU), a visual processing unit (VPU), and/or an Artificial intelligence (AI) dedicated processor such as a neural processing unit (NPU).

In an embodiment, the processor (180) is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductors. The processor (180) can be for example but not limited to a browser management controller, etc. The processor (180) includes a parent browser management controller (182), a channel management controller (184), and a child browser management controller (186).

In an embodiment, the parent browser management controller (182) is configured to open the parent browser window (1002) and manage various events associated with the parent browser window (1002). Further, the parent browser management controller (182) is configured to determine that child browser window (1004) needs to be opened by the parent browser window (1002) while the parent browser window (1002) is still opened. Here, the parent browser management controller (182) is configured to determine whether the child browser window (1004) with a same child browser window (1004) name already exists or not with the parent browser window (1002). If the child browser window (1004) having the same child browser window (1004) name already exists then the child browser window (1004) is not opened. If the child browser window (1004) having the same child browser window (1004) name does not exists already then the parent browser management controller (182) opens the child browser window (1004) from the parent browser window (1002). Therefore, the proposed method also eliminates duplication of the child browser window (1004)*s*. The opening of the child browser window (1004) can be triggered by an event associated with the parent browser window (1002). For example, consider a ticket created on the parent browser window (1002) for an event on a sub-application. Then the parent browser window (1002) automatically opens the child browser window (1004) for execution of the event on the sub-application.

In another example, consider that the user is viewing a grid comprising a plurality of events on the parent browser window (1002). At the same time, the user is also required to view certain content in the sub-application which requires the creation of the child browser window (1004). Therefore, here the requirement to view the certain content is the sub-application becomes the event that triggers the creation of the child browser window (1004).

The parent browser window (1002) and the child browser window (1004) can be of same origin for example with URL "www.abc" followed by ".com/foo.html" and "www.abc" followed by ".com/page.html," etc. The parent browser window (1002) and the child browser window (1004) can also be of different origins for example with URL "www.ex-ample" followed by ".com" and "www.abc" followed by ".com"; such as with different security levels for example http, https, etc.

In another embodiment, the parent browser management controller (182) is configured to determine that the parent browser window (1002) is closed when the child browser window (1004) is still open, send a notification to the child browser window (1004) that the parent browser window (1002) is closed, and automatically close the child browser window (1004). The child browser window (1004) may be destroyed within for example 2 seconds. For example, consider that the user accidentally closes the parent browser window (1002). Then, the closing of the parent browser window (1002) is notified to the child browser window (1004) and the child browser window (1004) is also closed.

In an embodiment, the channel management controller (184) is configured to receive an input for creating a communication channel between the parent browser window (1002) and the child browser window (1004) and open the child browser window (1004) from the parent browser window (1002). The communication channel between the parent browser window (1002) and the child browser window (1004) using for example but not limited to a PostMessage feature of the parent browser window (1002). The input for creating the channel includes but is not limited to: a Uniform Resource Locator (URL) for the child browser window (1004), a channel name indicating the channel between the parent browser window (1002) and the child browser window (1004), a parameter for indicating whether the child browser window (1004) is one of a new browser window and a new tab in the parent browser window (1002). Here, the user is allowed to provide multiple parameters indicating dimensions of the child browser window (1004) as well. Therefore, the user can create customized child browser window (1004)s.

Further, the channel management controller (184) is configured to create the channel between the parent browser window (1002) and the child browser window (1004) based on the received input. Therefore, the channel between the parent browser window (1002) and the child browser window (1004) enables live communication and not at events such as for example, closing or opening of the parent browser window (1002) and the child browser window (1004).

In an embodiment, the child browser management controller (186) is configured to send an initialization event to the parent browser window (1002) for performing a handshake. The parent browser window (1002) accepts the initialization event sent by the child browser window (1004) and performs the handshake. The child browser window (1004) then authenticates the handshake received from the parent browser window (1002) based on a channel name of the channel created between the parent browser window (1002) and the child browser window (1004). Further, the child browser management controller (186) is configured to receive the data by the child browser window (1004) through the created channel from the parent browser window (1002). In the proposed method the communication of the data between the parent browser window (1002) and the child browser window (1004) happens continuously and in real-time. The communication is not restricted to the beginning or end of the communication session as is done in conventional methods.

Furthermore, the child browser management controller (186) is configured to continuously monitor and determine that the child browser window (1004) needs to be closed and automatically send a response comprising output data from the child browser window (1004) to the parent browser window (1002) to reallocate a dump memory (120) associated with the child browser window (1004).

At least one of the plurality of modules/components of the processor (180) may be implemented through an AI model. A function associated with the AI model may be performed through memory (120). The one or a plurality of processors controls the processing of the input data in accordance with a predefined operating rule or the AI model stored in the non-volatile memory and the volatile memory. The predefined operating rule or artificial intelligence model is provided through training or learning.

Here, being provided through learning means that, by applying a learning process to a plurality of learning data, a predefined operating rule or AI model of a desired characteristic is made. The learning may be performed in a device itself in which AI according to an embodiment is performed, and/or may be implemented through a separate server/system.

The AI model may consist of a plurality of neural network layers. Each layer has a plurality of weight values and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning process is a method for training a predetermined target device (for example, a robot) using a plurality of learning data to cause, allow, or control the target device to make a determination or prediction. Examples of learning processes include, but are not limited to, supervised learning, unsupervised learning, semi-supervised learning, or reinforcement learning.

Although the FIG. 1 shows various hardware components of the system (100), but it is to be understood that other embodiments are not limited thereon. In other embodiments, the system (100) may include less or a greater number of components. Further, the labels or names of the components are used only for illustrative purpose and does not limit the scope of the invention. One or more components can be combined to perform same or substantially similar function for communication between the multiple browser windows in real-time.

FIG. 2 is a flow diagram (200) illustrating a method for communication between the multiple browser windows in real-time, according to an embodiment as disclosed herein.

Referring to the FIG. 2, at step 202, the method includes the system (100) opening the parent browser window (1002). For example, in the system (100) as illustrated in the FIG. 1, the processor (180) is configured to open the parent browser window (1002).

At step 204, the method includes the system (100) determining that the child browser window (1004) needs to be opened by the parent browser window (1002) while the parent browser window (1002) is opened. For example, in the system (100) as illustrated in the FIG. 1, the processor (180) is configured to determine that the child browser window (1004) needs to be opened by the parent browser window (1002) while the parent browser window (1002) is opened.

At step 206, the method includes the system (100) receiving the input for creating the communication channel between the parent browser window (1002) and the child browser window (1004). For example, in the system (100) as illustrated in the FIG. 1, the processor (180) is configured to receive the input for creating the communication channel between the parent browser window (1002) and the child browser window (1004).

At step 208, the method includes the system (100) opening the child browser window (1004) from the parent browser window (1002). For example, in the system (100) as illustrated in the FIG. 1, the processor (180) is configured to open the child browser window (1004) from the parent browser window (1002).

At step 210, the method includes the system (100) creating the channel between the parent browser window (1002) and the child browser window (1004) based on the received input. For example, in the system (100) as illustrated in the FIG. 1, the processor (180) is configured to create the channel between the parent browser window (1002) and the child browser window (1004) based on the received input.

At step 212, the method includes the system (100) receiving the data at the child browser window (1004) from the parent browser window (1002) through the created channel. For example, in the system (100) as illustrated in the FIG. 1, the processor (180) is configured to receive the data at the child browser window (1004) from the parent browser window (1002) through the created channel.

The various actions, acts, blocks, steps, or the like in the flow diagram (200) may be performed in the order presented, in a different order or simultaneously. Further, in some embodiments, some of the actions, acts, blocks, steps, or the like may be omitted, added, modified, skipped, or the like without departing from the scope of the invention.

Figure 3:
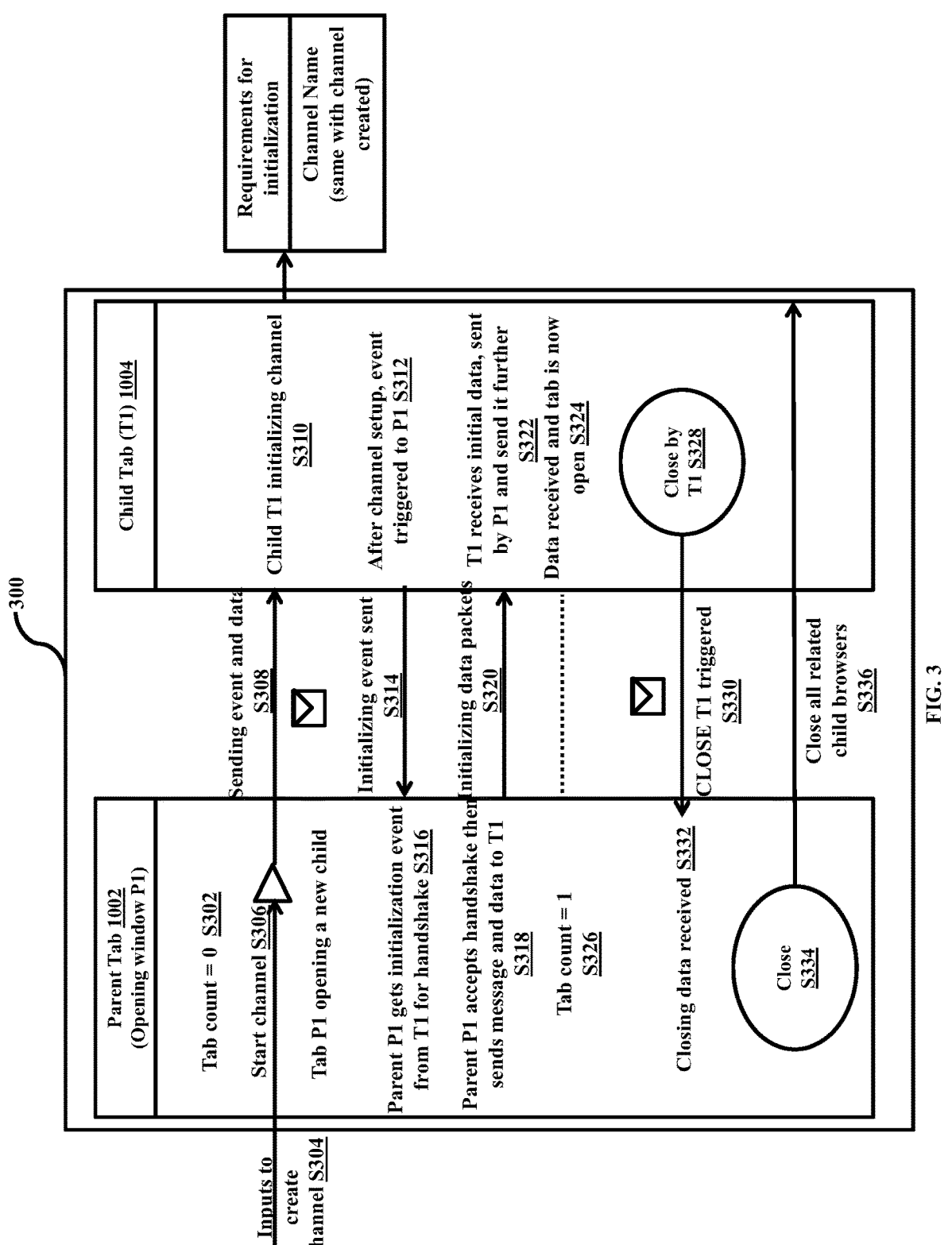
FIG. 3 is a signalling diagram illustrating communication between a parent browser window and a child browser window, according to an embodiment as disclosed herein.

FIG. 3 is a signaling diagram (300) illustrating the communication between the parent browser window (1002) and the child browser window (1004), according to an embodiment as disclosed herein. Referring to the FIG. 3, at step S302, a Tab count associated with the parent browser window (1002) is 0 i.e., there are no child browser window (1004)s associated with the parent browser window (1002). At step S304 the parent browser window (1002) receives the inputs to create the channel with the child browser window (1004). The inputs used are as follows:

1. Uniform resource locator (URL): string—URL for the child browser window (1004).
2. channelName: string—Specific to the child browser window (1004) and the channelName should be a unique id. There should not be any other child browser window (1004) existing with the same channelName.

3. openInNew Window: Boolean—If a child browser window (1004) is required or just a child browser tab in the same window.
4. windowHeight and windowWidth: number—In case of requirements of the child browser window (1004) setting dimensions such as the height and width of the child browser window (1004) can be customized by the user.

On receiving the inputs the parent browser window (1002) at step S306 starts the channel between the parent browser window (1002) and a new child browser window (1004). To start the channel between the parent browser window (1002) and the child browser window (1004), the parent browser window (1002) (referred to as client P1) calls CreateChannel API. Here, initially an instance is created on channelCommunicator in a constructor of the system (100) or any initialization method. The CreateChannel API (API 1) is as below:

```
AppChannelService.createChannel(
    Document.baseURL + '/newurlpath/create',
    'channelName'
)           API 1
```

When the CreateChannel API is called, the child browser window (1004) is created and the channel between the parent browser window (1002) (P1) and the child browser window (1004) (C1) is also created. The CreateChannel API accepts the inputs provided to the parent browser window (1002) while creating the child browser window (1004). At step S308, the parent browser window (1002) sends the event and data related to the starting of the communication channel between the parent browser window (1002) and the child browser window (1004). At step S310, the child browser window (1004) (T1) opening process is initiated. If the child browser window (1004) with same name is already opened then the requested child browser window (1004) will not be opened. The request for the initial handshake to the P1 and determining the existence of the child browser window (1004) with same name is checked using the below mentioned API 2:

```
this.channel = AppChannelService.           API 2 getChannel('SamechannelName as passed from P1')
```

At step S312, once the channel setup is completed, an event for initializing a handshake with the P1 is triggered by the T1. At step S314 the initializing event is sent over the created channel between the P1 and the T1. At step S316, the P1 gets the initialization event from the T1 for the handshake and at step S318 the P1 accepts the handshake and then sends message and data to the T1 over the created channel between the P1 and the T1. The P1 uses API 3 mentioned below to send the data to the T1:

```
this.channel.observable.next({
    data: {
    },
    event: 'SENDING_DATA',
})           API 3
```

At step S320 the initialized data packets are sent over the created channel between the P1 and the T1. At step S322 the T1 receives the initial data sent by the P1 and sends it further based on the event requirement. After SENDING_DATA is triggered the T1 subscribes to getChannel method to get the data using API 4 mentioned below:

```
this.channel.observable.subscribe((sourceData) => {
    console.log('Receiving Source Data', sourceData);
})          API 4
```

The API 3 can be used to send data from any tab and the API 4 can be used to receive data from any tab. At step S324, it may be noted that the data sent by the P1 is received at the T1 and the T1 is now open which is indicated at S326 with Tab count=1. The normal flow of data continues between the P1 and the T1 using the channel created between the P1 and the T1.

Consider that at some point the event associated with the T1 is completed or the user wants to close the T1, therefore the T1 has to be closed. Then, at step S328 a Close trigger is sent by the T1 to the P1 which passes through the channel as indicated by CLOSE T1 at step S330. The CLOSE T1 trigger will include the closing data associated with the T1 which is a default response. At step S332 the P1 receives the closing data from the T1 and provides a Close command at step S334. This is done using API 5 provided below:

```
this.channel.observable.next({
    data: { 'send data here'
},
    event: 'CLOSE',
})          API 5
```

The APIS can be used in any of the tabs want to send some custom data at closing. Therefore, at step S336 the Close will lead to closure of all related child browsers (T1 and other related browsers). After the close event, a destroy-Channel Api is automatically initialized to reallocate dump memory. The destroyChannel Api takes, channel name as input.

The output of the communication between the P1 and the T1 will be a json that is been sent from the T1 to the P1 while closing all Child tabs. The json will consist of two parts as follows:

1. Data which signifies any data that the T1 can send to the P1
2. Event which signifies if the T1 or the P1 are closing then of initializing. In output case, the event will be 'CLOSE'

```
●   Output json
    {
        "data": {
            "configId": "value",
            "subConfigs": [
                "datavalues",
            ]
        },
        "event": "CLOSE"
```

Therefore, unlike to the conventional methods and systems, in the proposed method the memory is allocated when needed by any new browser window (here the child browser window (1004) T1). The T1 then uses the allocated memory to perform write and read operations. When the T1 is no longer in use (i.e., when it is closed), the memory allocated to the T1 is released. Further, the use of PostMessage enables to work with different origin or same origin browser windows.

Figure 4:
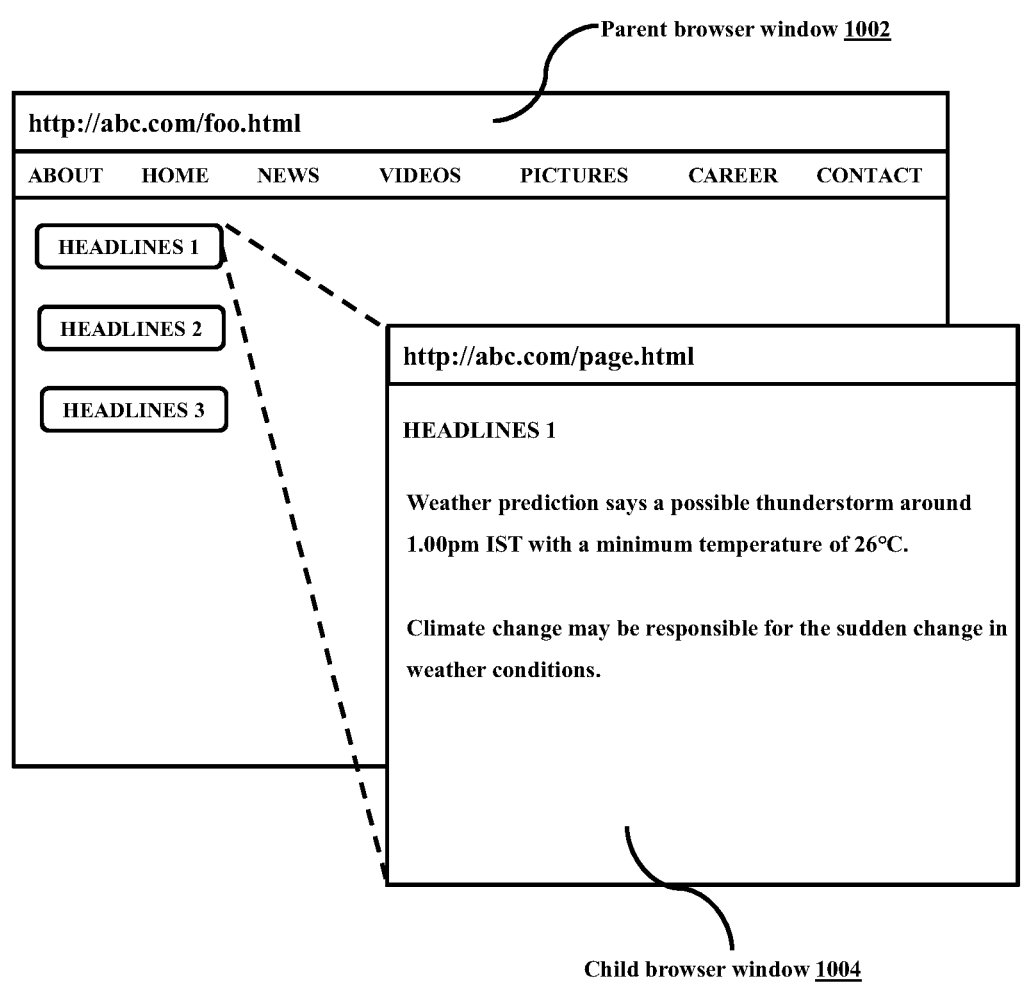
FIG. 4 is an example illustrating the communication between the parent browser window and the child browser window of same origin, according to an embodiment as disclosed herein.

FIG. 4 is an example illustrating the communication between the parent browser window (1002) and the child browser window (1004) of same origin, according to an embodiment as disclosed herein. Referring to the FIG. 4, consider that the parent browser window (1002) has an origin with URL "www.abc" followed by ".com/foo.html." Consider that a latest headline is added to a list of headlines as Headlines 1. Further, the system (100) detects that the child browser window (1004) needs to be opened to provide user access to a content of the Headlines 1. The system (100) then automatically opens the child browser window (1004) having an origin with URL "www.abc" followed by ".com/page.html." Here, the parent browser window (1002) and the child browser window (1004) are of the same origin. Further, the system (100) also creates the channel for communication between the parent browser window (1002) and the child browser window (1004) which enables real-time exchange of data between the parent browser window (1002) and the child browser window (1004). The system (100) also allows the user to customize the child browser window (1004) by providing various inputs such as dimensions of the child browser window (1004). Then, the child browser window (1004) which is automatically opened will have the customized dimensions.

In case the parent browser window (1002) is closed then the child browser window (1004) is notified and automatically closed.

In case the child browser window (1004) needs to be closed after a certain duration of time automatically then the child browser window (1004) sends the last set of output data to the parent browser window (1002) before closing.

FIG. 5 is an example illustrating the communication between the parent browser window (1002) and the child browser window (1004) of different origins, according to an embodiment as disclosed herein. Referring to the FIG. 5, consider that the parent browser window (1002) has an origin with the URL "www.example" followed by ".com." Consider that a ticket is created for a specific event. The ticket acts as the trigger for the creation of the child browser window (1004). The trigger for the creation of the child browser window (1004) can include but is not limited to e-mail notifications, social network activity, etc.

The system (100) detects that the child browser window (1004) needs to be opened to accommodate the event associated with the ticket and then automatically opens the child browser window (1004) having an origin with the URL "www.XXX" followed by ".com." Here, the parent browser window (1002) and the child browser window (1004) are of different origins. Further, the system (100) also creates the channel for communication between the parent browser window (1002) and the child browser window (1004) which enables real-time exchange of data between the parent browser window (1002) and the child browser window (1004). The system (100) also allows the user to customize the child browser window (1004) by providing various inputs such as the dimensions of the child browser window (1004). Then, the child browser window (1004) which is automatically opened will have the customized dimensions.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

We claim:

1. A method for communication between multiple browser windows in real-time by a system, wherein the method comprises:

opening, by a processor of the system, a parent browser window;

determining, by the processor, at least one child browser window needs to be opened by the parent browser window while the parent browser window is opened;

receiving, by the processor, an input for creating a communication channel between the parent browser window and the at least one child browser window;

opening, by the processor, the at least one child browser window from the parent browser window, the at least one child browser window having a different web application source origin than the parent browser window;

creating, by the processor, the communication channel between the parent browser window and the at least one child browser window based on the received input; and receiving, by the processor, data by the at least one child browser window from the parent browser window through the created communication channel, wherein opening, by the processor, the at least one child browser window from the parent browser window comprises:

determining, by the processor, that another child browser window comprising a same child browser window name does not exist already with the parent browser window; and opening, by the processor, the at least one child browser window from the parent browser window based on determining that the other child browser window comprising the same child browser window name does not already exist with the parent browser window, such that the at least one child browser window is not opened if the other child browser window comprising the same child browser window name does exist already with the parent browser window.

2. The method as claimed in claim 1, wherein the input for creating the communication channel comprises at least one of a uniform resource locator (URL) for the at least one child browser window, a communication channel name indicating the communication channel between the parent browser window and the at least one child browser window, a parameter for indicating whether the at least one child browser window is one of a new browser window and a new tab in the parent browser window and a plurality of parameters indicating dimensions of the at least one child browser window.

3. The method as claimed in claim 1, wherein receiving, by the processor, the data by the at least one child browser window from the parent browser window through the created communication channel comprises:

sending by the at least one child browser window an initialization event to the parent browser window for performing a handshake;

accepting by the parent browser window the initialization event sent by the at least one child browser window and performing the handshake;

authenticating the handshake received from the parent browser window by the at least one child browser window based on a communication channel name of the communication channel created between the parent browser window and the at least one child browser window;

sending the data by the parent browser window to the at least one child browser window through the created communication channel; and receiving the data by the at least one child browser window through the created communication channel from the parent browser window.

4. The method as claimed in claim 1, further comprises:

determining, by the processor, that the at least one child browser window needs to be closed;

automatically sending, by the processor, a response comprising output data from the at least one child browser window to the parent browser window to reallocate a dump memory associated with the at least one child browser window.

5. The method as claimed in claim 1, further comprises:

determining, by the processor, that the parent browser window is closed when the at least one child browser window is still open;

sending, by the processor, a notification to the at least one child browser window that the parent browser window is closed; and automatically closing, by the processor, the at least one child browser window.

6. The method as claimed in claim 1, wherein the input for creating the communication channel comprises a uniform resource locator (URL) for the at least one child browser window, the URL being different than a URL for the parent browser window.

7. The method as claimed in claim 1, wherein the input for creating the communication channel comprises a parameter for indicating whether the at least one child browser window is a new tab in the parent browser window.

8. The method as claimed in claim 1, wherein the determining the at least one child browser window needs to be opened by the parent browser window while the parent browser window is opened, comprises determining to open the at least one child browser window in response to an email notification or a social network activity notification being received.

9. A system for communication between multiple browser windows in real-time, wherein the system comprises:

a memory storing instructions;

a processor coupled to the memory;

a communicator (140) coupled to the memory and the processor; and wherein the processor is configured to execute the stored instructions to:

open a parent browser window, determine at least one child browser window needs to be opened by the parent browser window while the parent browser window is opened, receive an input for creating a communication channel between the parent browser window and the at least one child browser window, open the at least one child browser window from the parent browser window, the at least one child browser window having a different web application source origin than the parent browser window,

create the communication channel between the parent browser window and the at least one child browser window based on the received input, and
receive data by the at least one child browser window from the parent browser window through the created communication channel,
wherein the processor is configured to open the at least one child browser window from the parent browser window by executing the instructions to:
determine that another child browser window comprising a same child browser window name does not exists already with the parent browser window; and
open the at least one child browser window from the parent browser window based on determining that the other child browser window comprising the same child browser window name does not already exist with the parent browser window, such that the at least one child browser window is not opened if the other child browser window comprising the same child browser window name does exist already with the parent browser window.

10. The system as claimed in claim 9, wherein the input for creating the communication channel comprises at least one of a URL for the at least one child browser window, a communication channel name indicating the communication channel between the parent browser window and the at least one child browser window, a parameter for indicating whether the at least one child browser window is one of a new browser window and a new tab in the parent browser window and a plurality of parameters indicating dimensions of the at least one child browser window.

11. The system as claimed in claim 9, wherein the processor is configured to receive the data by the at least one child browser window from the parent browser window through the created communication channel comprises:

send by the at least one child browser window an initialization event to the parent browser window for performing a handshake;
accept by the parent browser window the initialization event sent by the at least one child browser window and performing the handshake;
authenticate the handshake received from the parent browser window by the at least one child browser window based on a communication channel name of the communication channel created between the parent browser window and the at least one child browser window;
send the data by the parent browser window to the at least one child browser window through the created communication channel; and
receive the data by the at least one child browser window through the created communication channel from the parent browser window.

12. The system as claimed in claim 9, wherein the processor is further configured to:
determine that the at least one child browser window needs to be closed;
automatically send a response comprising output data from the at least one child browser window to the parent browser window to reallocate a dump memory associated with the at least one child browser window.

13. The system as claimed in claim 9, wherein the processor is further configured to:
determine that the parent browser window is closed when the at least one child browser window is still open;
send a notification to the at least one child browser window that the parent browser window is closed; and
automatically close the at least one child browser window.

* * * * *